United States Patent
Wong

Patent Number: 5,988,823
Date of Patent: Nov. 23, 1999

[54] COLLAPSIBLE LAPTOP COMPUTER HOOD

[76] Inventor: Ken E. Wong, 254 Huali St. #6, Honolulu, Hi. 96813

[21] Appl. No.: 09/165,877

[22] Filed: Oct. 2, 1998

[51] Int. Cl.$^6$ .............................. G02B 27/00; G02B 21/00
[52] U.S. Cl. ........................... 359/601; 359/610; 359/612; 348/842
[58] Field of Search ................................... 359/601, 610, 359/611, 612, 613, 474; 348/834, 842; 248/346.3, 346.5

[56] References Cited

U.S. PATENT DOCUMENTS

| | | |
|---|---|---|
| D. 311,912 | 11/1990 | Schmidt . |
| D. 385,543 | 10/1997 | Phirippidis et al. . |
| D. 397,686 | 9/1998 | Bregman et al. . |
| 3,562,939 | 2/1971 | Jacobs, Jr. et al. .................. 40/365 |
| 3,849,598 | 11/1974 | Hoffberger, II et al. . |
| 4,314,280 | 2/1982 | Rose . |
| 4,444,465 | 4/1984 | Giulie et al. . |
| 5,069,529 | 12/1991 | Takahashi ........................ 359/601 |
| 5,101,298 | 3/1992 | Lentz et al. . |
| 5,121,253 | 6/1992 | Waintroob . |
| 5,233,468 | 8/1993 | McNulty . |
| 5,274,501 | 12/1993 | Stroll, Jr. ......................... 359/613 |
| 5,579,799 | 12/1996 | Zheng . |
| 5,589,985 | 12/1996 | Heller et al. . |
| 5,877,896 | 3/1999 | Gremban ......................... 359/601 |

*Primary Examiner*—Cassandra Spyrou
*Assistant Examiner*—Mark A. Robinson

[57] ABSTRACT

A simple and inexpensive portable laptop computer hood is disclosed in the form of a sheet with panels, flaps, fold lines, and a single viewing aperture. The single sheet of foldable material can be folded into a 3-dimensional hood operational configuration or a flattened configuration for easy storage and transportation. Because these sheet's panels do not lock into specific positions when the sheet is configured into a 3-dimensional hood, they can be easily repositioned to accommodate variations in both laptops size dimensions and individual operator preferences. A notable aspect of the 3-dimensional configuration of the laptop computer hood is that it allows the laptop computer's keyboard to remain outside of the light-protected compartment area for easy access by the laptop computer's operator. Strategically placed side panels enable the unit to independently stand on its own as the laptop computer is inserted into the compartment. Flaps on the end of these side panels then serve to anchor the device around the laptop computer once it has been placed inside the hood in the event wind is present . . . . a likely scenerio in an outdoor setting. Once configured into its 3-dimensional operational configuration, the hood's front panel can either be left open by flipping the front panel up and onto the roof of the hood or be used to enclose the laptop computer screen by allowing it to drop down and into the front of the hood. In the latter case, a viewing aperture is located in the front panel through which the laptop computer operator can then view the fully enclosed laptop computer screen. Because the device can be manufactured with a single sheet of material, printing can be added to produce a simple, low cost advertising medium for a company, its goods and/or services.

7 Claims, 1 Drawing Sheet

COLLAPSIBLE LAPTOP COMPUTER HOOD

FIELD OF THE INVENTION

The present invention relates to devices used to temporarily house a portable laptop computer screen to reduce the amount of surrounding light which can overpower the screen's luminosity and make viewing the screen difficult. More specifically, this invention relates to a collapsible hood that can be stored flat and then quickly and easily be folded and reconfigured into a 3-dimensional hood to house and enclose a portable laptop computer screen. As it houses and encloses the computer laptop screen, the invention's 3-dimensional configuration allows the laptop's operator continued unobstructed access to the computer's keyboard. The option to open or close the front panel of the laptop hood while in its 3-dimensional configuration provides the operator with the ability to adjust the laptop hood to varying lighting conditions. Comprised of a single sheet of die-cut card material with panels, flaps, fold lines, and a single viewing aperture; properly folding the sheet of material along the fold lines produces an operational 3-dimensional hood configuration. Because the panels do not lock into specific positions, they can be easily repositioned to accomodate variations in both laptops size dimensions and individual operator preferences.

BACKGROUND ART

This present invention relates to devices used to enclose and shield objects from outside light sources. A search for awarded patents in these areas did not reveal inventions that addressed the unique novel characteristics and requirements of the Collapsible Laptop Computer Hood which is comprised solely of a single sheet of die-cut material and which can be reconfigured into either a 3-dimensional operational configuration or into a flattened storage configuration.

It is an objective of the Collapsible Laptop Computer Hood to provide a temporary cover for a laptop computer and minimize the amount of surrounding light upon the surface of the computer screen. It is further the objective of the invention to provide a hooded compartment with a front panel that can be opened or closed to allow a laptop computer operator the ability to adjust usage of the hood under varied lighting conditions.

It is also an objective of the Collapsible Laptop Computer Hood to provide for a computer laptop hood that can accomodate different sizes and shapes of computer laptops which vary by manufacturer, make, and model.

It is also an objective of the Collapsible Laptop Computer Hood to form an unusually simple device that is made substantially of a single sheet of material which folds into 3-dimensional operation position and also a flattened storage position. It is further the objective of the Collapsible Computer Laptop Hood to be able to stand on it's own while the laptop computer is being inserted into the device and arranged and positioned by its operator.

It is another objective of the Collapsible Laptop Computer Hood to form a reconfigurable hood from a substantially flat sheet of pressed paper which, furthermore, can be applied to a computer laptop without significant handling or operations of assembly, thereby reducing the number of steps involved in making the device ready for use for the end user

SUMMARY OF THE INVENTION

The invented Collapsible Laptop Computer Hood is designed for operating a laptop computer in outdoor settings where viewing a laptop computer screen may be difficult because the presence of sunlight can overpower a computer laptop screen's luminosity. The Collapsible Laptop Computer Hood overcomes this problem by creating a compartment around the laptop computer's screen with a design that is easy to assemble, disassemble, transport, and store.

The purpose of the device is to provide a person operating a portable laptop computer in an outdoor setting with a means to shield the laptop computer screen from the brightness of sunlight. The positive attributes of laptop computers in being simple to carry and easy to set-up are the same design objectives of the Collapsible Laptop Computer Hood. These design objectives focus on the desirable ability of the device to fold into a flattened storage configuration and also be quickly and easily set-up into an operational 3-dimensional configuration. Such design elements have positive implications for both the manufacturer and the end user. Minimal production is required since there are no separate parts to assemble. A simple die-cut process can quickly and easily produce the device which, by adding fold lines, is immediately consumer ready. The one-piece material construction can then be quickly and efficiently folded into a 3-dimensional hood to house a laptop computer. The dimensions of the design allow the hood to accomodate a wide range of variations in present day laptop computer screen sizes and keyboard dimensions. A notable aspect of the 3-dimensional configuration of the present invention is that it allows the laptop's keyboard to remain outside of the light-protected compartment area for easy access by the laptop computer's operator. Strategically placed side panels enable the unit to independently stand on its own as the laptop is inserted into the compartment. Flaps on the end of these side panels then serve to anchor the device under the laptop computer once it has been placed inside the hood in the event that wind is present . . . a likely scenerio in an outdoor setting. Once assembled into its 3-dimensional configuration, the front panel of the hood can either be left open by flipping the front flap up and onto the roof of the hood or be used to completely shield the laptop screen by dropping it down and into the front of the hood. In the latter case, a viewing aperture is located in the front panel through which the laptop computer's operator can then view the fully enclosed laptop computer screen. The laptop computer hood can also be used not only to block out excess light in outdoor settings, but also to create a private viewing area when the laptop computer operator is in the close proximity of other individuals (example: seating arrangements in airplanes). Once the operator is finished using the present invention, the 3-dimensional hood can then be quickly folded back into a flattened configuration for easy storage and transportation.

The Collapsible Laptop Computer Hood comprises a single sheet of die-cut card stock or similar pliable material which can be folded to create a temporary 3-dimensional hood to enclose and shield a portable laptop computer screen from excessive bright light (such as the sun in an outdoor setting). Additionally, the single-piece sheet of die-cut material contains panels, flaps, fold lines, and a single viewing aperture (located in the area of the sheet identified as the front panel). Properly folding the sheet of material along the fold lines produces a 3-dimensional hood configuration with side panels that serve as structural legs that enable the device to stand up independently, thereby freeing the computer operator's hands for positioning the laptop inside the resulting 3-dimensional hood. The option to open or close the front panel of the laptop hood while in its 3-dimensional configuration provides added flexibility for the operator in adjusting to varied lighting conditions.

Because the laptop hood can be folded down into a flattened storage configuration, the laptop hood can be easily transported along with the laptop computer in a laptop carrying case as it shares the dominant characteristics that make laptops so popular . . . easy to carry, transport, and set-up. The Collapsible Laptop Computer Hood also bodes well for retail distribution as the flat storage configuration and resulting small footprint makes the laptop hood an easily packaged point-of-sale item. The surface of the laptop hood also provides potential surface area for advertising. Because the device can be manufactured with a single sheet of material, printing can be added to advertise a company, its goods and/or services. Because of its simple, low cost material construction, the laptop hood may serve as an advertising premium in corporate marketing campaigns. Finally, the design of the laptop hood allows it to accomodate a great majority of the various sizes and dimensions of today's laptop computers. Because the device's panels only fold but do not lock into position, they can also be repositioned at different angles to accomodate variations in both laptop computer size dimensions and individual operator preferences.

The current design of the Collapsible Laptop Computer Hood strives to achieve simplicity in both manufacturing and actual use, however, other design aspects might include additional minor product details. Fastening means (example: velcro) might be added to secure the device in either its flattened or 3-dimensional configuration. A tinted transparent plastic lens might be placed in the front panel viewing aperture to further reduce incoming light. It is, however, a design priority of the laptop hood to achieve a design which is both versatile and functional, yet extremely simple for purposes of both manufacturing and operator friendliness. The present design achieves both of these priorities.

Although the popularity of laptop computers and related peripheral devices has increased in recent years, an analysis of computer products from leading manufacturers of computer-related products reveals no items of similar nature to the present invention. In fact, it appears that the needs addressed by the Collapsible Laptop Computer Hood have yet to be recognized and answered with any product solution at all. It is the opinion of this inventor that the introduction of a product similar to the Collapsible Laptop Computer Hood is inevitable with the continued growth and popularity of portable laptop computers.

LIST OF REFERENCES NUMERALS

Figure 1:
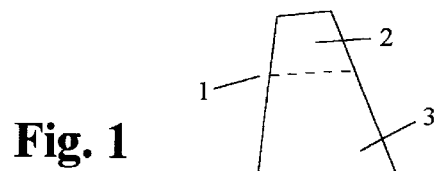
FIG. 1 is a top plain view of the of the Collapsible Laptop Computer Hood, shown unfolded.

1. Right side panel flap fold line
2. Right side panel flap
3. Right side panel
4. Upper front panel fold line
5. Lower front panel fold line
6. Front panel flap
7. Front panel flap fold line
8. Front panel
9. Viewing aperture
10. Left side panel
11. Left side panel flap
12. Left side panel flap fold line
13. Left side panel fold line
14. Roof panel
15. Back panel
16. Back panel flap
17. Back panel flap fold line
18. Back panel fold line
19. Right side panel fold line
20. Sheet

DETAILED DESCRIPTION AND BEST MODE OF CARRYING OUT THE INVENTION

Referring to FIG. 1, the Collapsible Laptop Computer Hood is shown in the form of sheet 20, also described as an elongated square having various panels, flaps, fold lines, and a viewing aperture 9. The simple one-piece design of sheet 20 minimizes production costs and steps. A viewing aperture 9 is located on the front panel 8 of sheet 20. Right side panel 3 and left side panel 10 adjoin and extend off the roof panel 14 of sheet 20.

Figure 2:
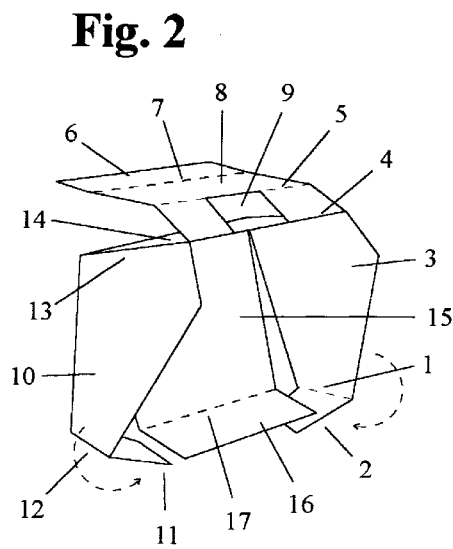
FIG. 2 is a perspective view of the Collapsible Laptop Computer Hood as it is being reconfigured into a 3-dimensional hood, indicating the directional movements of the present invention's various panels and flaps.

As shown in FIG. 2, when sheet 20 is folded into an operational 3-dimensional configuration, a Collapsible Laptop Computer Hood can be assembled by folding left side panel fold line 13, right side panel fold line 19 hidden), left side panel flap fold line 12, right side panel flap fold line 1, upper front panel fold line 4, lower front panel fold line 5, front panel flap fold line 7, back panel fold line 18 (hidden), and back panel flap fold line 17. Proper configuration requires that back panel flap 16 folds forward at back panel flap fold line 17 and rest on top of right side panel flap 2 and left side panel flap 11. The weight of a laptop computer inserted into the resulting configuration and positioned on top of back panel flap 16 would then anchor the laptop hood around the laptop computer (FIG. 4).

Figure 3:
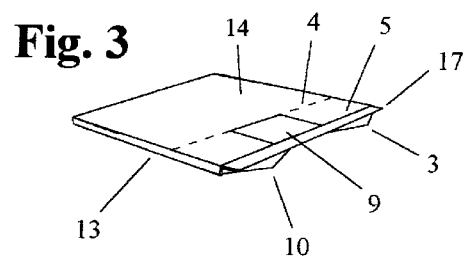
FIG. 3 is a perspective view of a folded Collapsible Laptop Computer Hood in its flattened folded storage configuration.

As shown in FIG. 3, a novel feature of the Collapsible Laptop Computer Hood is its ability to fold down into a flattened storage configuration. The device's marketability is enhanced because, in its flattened storage configuration, the Collapsible Laptop Computer Hood can be easily transported in a laptop carrying case along with a laptop computer. The resulting small footprint also makes the laptop hood an attractive point-of-sale retail item.

Figure 4:
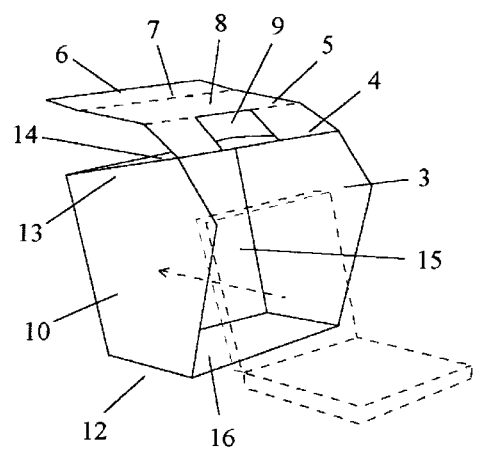
FIG. 4 is a perspective view of the Collapsible Laptop Computer Hood in its 3-dimensional operational configuration with front panel raised and ready to receive an operator's laptop computer.

As shown in FIG. 4, the Collapsible Laptop Computer Hood is able to stand by itself in its operational 3-dimensional configuration by the vertical support of left side panel 10 and right side panel 3 which serve as structural legs for the device. These two panels become anchored into position when right side panel flap 2 (hidden) and left side panel flap 11 (hidden) (FIG. 2) are positioned beneath back panel flap 16. With front panel 8 flipped up and on top of roof panel 14 at upper front panel fold line 4 which acts as a structural hinge for front panel 8, the laptop hood is then able to receive the operators laptop computer. Because the laptop hood is free-standing in this resulting configuration, both of the operator's hands are free to slide the laptop computer into the front of the hood and position it for ideal use. The weight of the inserted laptop computer on back panel flap 16 now resting on top of right side panel flap 2 (hidden) and left side panel flap 11 (hidden) then locks left side panel 10, right side panel 3, back panel 15, and roof panel 14 into their final positions. If enough outside light is reduced upon the laptop computer screen to provide adequate viewing capability in this configuration with the hood's front panel 8 flipped up and over roof panel 14, the laptop computer operator may use the laptop hood as is or drop front upon the laptop's screen.

Figure 5:
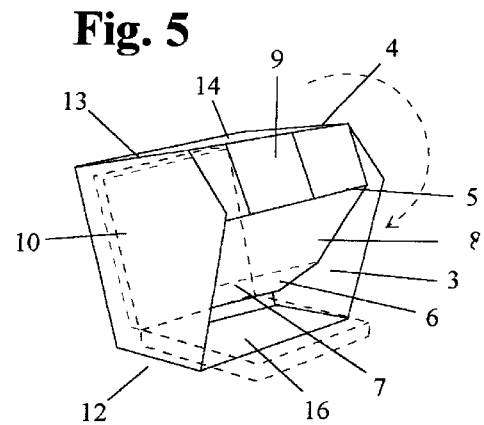
FIG. 5 is a perspective view of the Collapsible Laptop Computer Hood in its 3-dimensional configuration with the front panel lowered and able to fully enclose an inserted laptop computer screen leaving the laptop computer's keyboard exposed and accessible to the computer operator.

As shown in FIG. 5, the laptop computer operator can apply the front panel 8 of the Collapsible Laptop Computer Hood to completely enclose the inserted laptop computer's screen by flipping front panel 8 forward and downward at upper front panel fold line 4 which acts as a structural hinge until front panel flap 6 rests upon and against the bottom of the laptop computer's screen. Front panel flap fold line 7 and lower front panel fold line 5 then enable front panel 8 to adjust to variations in both size dimensions and exact position and placement of the operator's laptop computer inside the overall hooperating. With front panel 8 covering the front of the hood, the operator is then able to continue viewing the screen through viewing aperture 9. An important novel aspect of this resulting configuration is that the laptop computer's keyboard remains outside of the enclosed compartment area for easy access by the laptop computer operator.

Alternatively, the Collapsible Laptop Computer Hood can be made with different dimensions and angles to accomodate the wide size range of laptop computers. The resulting angle of viewing or back panel angle may be altered by varying the degree by which certain panels are cut or folded. More specifically, the present invention may be produced in different sizes and dimensions to accomodate the increasing sizes of today's laptop computer screens as well as the growing popularity of palmtop computers with their much smaller screens.

Many materials are envisioned for use in making sheet 20 including pressed paper pulp and thin sheet plastics. Pressed pulp is easily formed and relatively inexpensive. Pressed pulp is also desirable for creating a product which is biodegradable and environmentally friendly. Light-weight sheet plastic may be substituted which has both desirable and undesirable inherent qualities. While being non-biodegradable, plastic is more resistant to destruction which may be desirable when producing more wear-resistant versions of the Collapsible Laptop Computer Hood. Both materials may easily be printed with graphic indicia to provide potential surface space for advertising. Because the device can be manufactured with a single sheet of material, printing can be added to advertise a company, its goods and/or services. Because of its simple, low cost material construction, the Collapsible Laptop Computer Hood may serve as an advertising premium in corporate marketing campaigns.

I claim:

1. A collapsible laptop computer hood comprising:

a single, one-layer sheet of elongated material with two ends and two extended side panels, said sheet including a plurality of fold lines;

each of said side panels having a fold line to enable pivoting of said side panels with respect to said sheet, said side panels serving as structural legs and being in a vertical orientation when the hood is in an operational configuration, said hood including a space between said side panels for accommodating a laptop computer;

one of said ends having an upper fold line serving as a structural hinge for and defining a front panel extending from a roof panel, said front panel may be opened and closed by manual actuation, said front panel further having a lower fold line and a viewing aperture adjacent to and between said upper and lower fold lines, said front panel in said operational configuration being located in front of a screen of said laptop computer such that said screen is visible through said viewing aperture, said viewing aperture having a width which is less than a width of said front panel;

wherein said hood is collapsible to enable conversion between said operational configuration and a flattened storage configuration.

2. The collapsible laptop computer hood of claim 1, wherein said side panels comprise flaps on the ends thereof, said computer resting on said flaps when located in said space to maintain said panels in said operational configuration.

3. The collapsible laptop computer hood of claim 1, wherein said sheet further comprises a back panel.

4. The collapsible laptop computer hood of claim 3, wherein said back panel comprises a flap at an end thereof, said computer resting on said flap when located in said space to maintain said back panel in said operational configuration.

5. The collapsible laptop computer hood of claim 1, wherein said panels are adjustable in a non-locking configuration to accommodate various laptop computer dimensions.

6. The collapsible laptop computer hood of claim 1, wherein said front panel further comprises an adjustable flap at an end thereof which enables said front panel to conform to various laptop computer dimensions.

7. The collapsible laptop computer hood of claim 1, wherein said computer hood when in said operational configuration includes inner and outer surfaces which may display graphics or other information.

* * * * *